June 19, 1962 H. D. GRIFFITHS ET AL 3,040,254
TEST PROBE
Filed Aug. 20, 1958 2 Sheets-Sheet 1
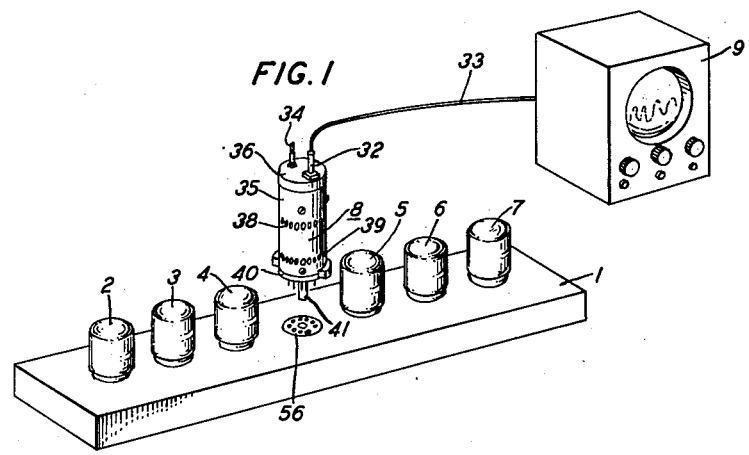
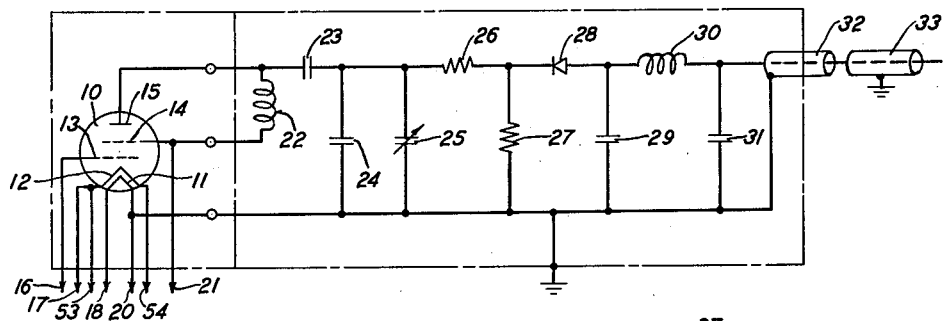
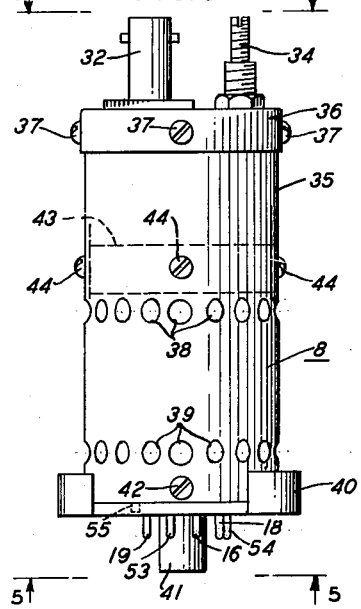
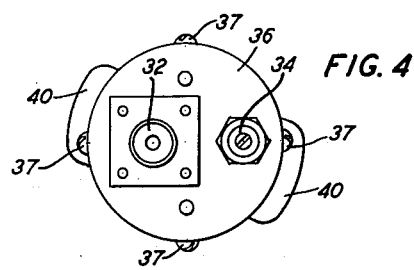
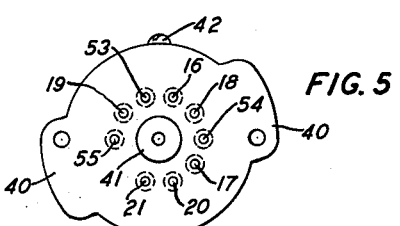
INVENTORS H.D. GRIFFITHS
R.H. HIGGINS
W.E. STUDDIFORD
BY
ATTORNEY

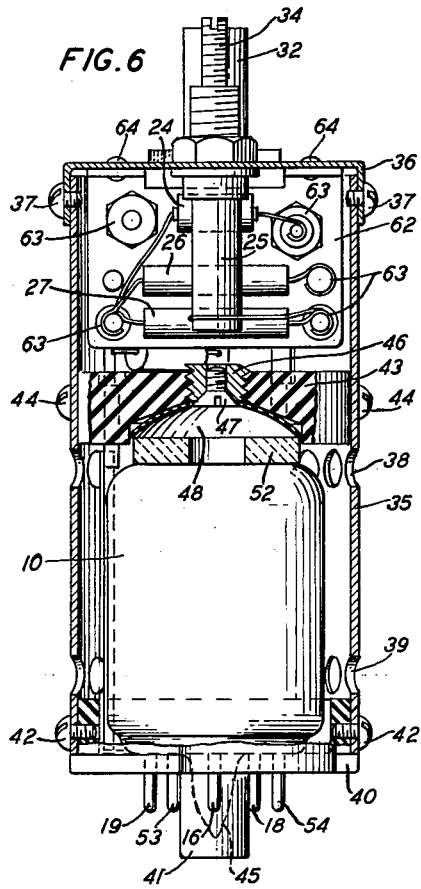
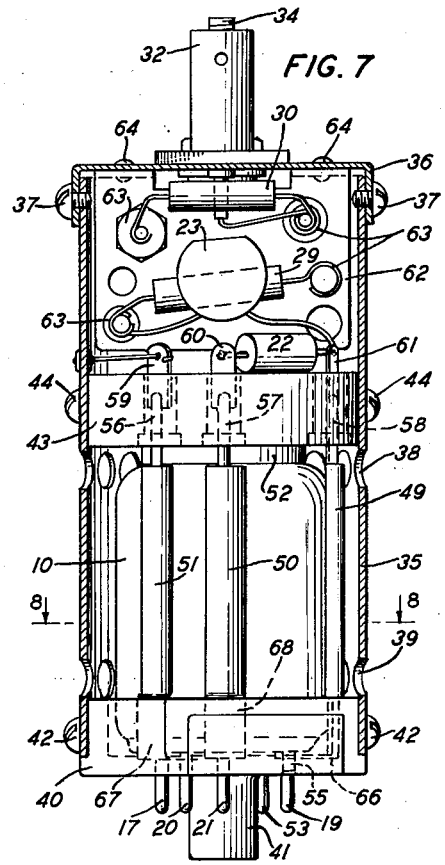
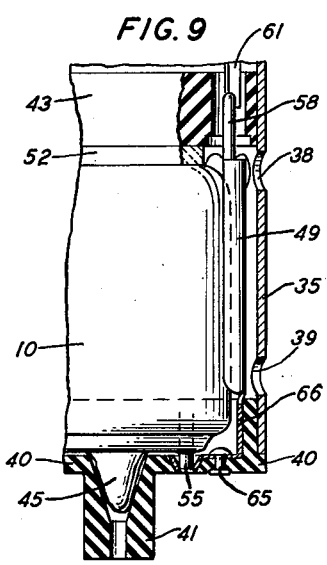
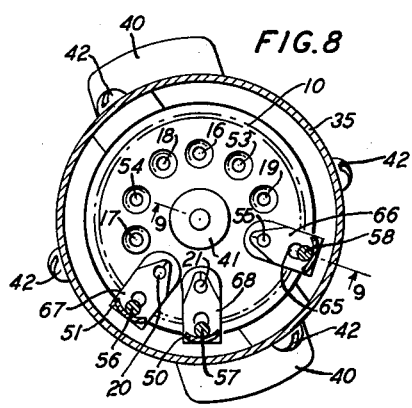

United States Patent Office 3,040,254
Patented June 19, 1962

3,040,254
TEST PROBE
Herbert D. Griffiths, North Andover, Mass., and Robert
H. Higgins and William E. Studdiford, Summit, N.J.,
assignors to Bell Telephone Laboratories, Incorporated, New York, N.Y., a corporation of New York
Filed Aug. 20, 1958, Ser. No. 756,112
2 Claims. (Cl. 324—158)

This invention relates to test devices for testing circuitry including electron discharge devices and more particularly to test probe devices.

Devices for testing electronic apparatus and circuitry range from relatively simple meters employing probes, pins, or clips that are applied by hand at the desired test point, to relatively complex permanently installed testing arrangements in which test readings on an operating circuit are made available either continuously or upon the operation of a switch. Many situations exist, however, wherein the availability of test equipment combining the best features of the two broad types noted would be particularly desirable. An electronic tube tester of the plug-in type is an approach to such a combination insofar as the testing of tubes alone is concerned. Additionally, the principle of the tube tester has, in a sense, been extended to devices for testing circuitry which includes electron discharge devices and accommodating sockets therefor. For example, certain known testing devices are equipped with prongs or pins adapted to fit the accommodating socket of an electron discharge device in the circuit to be tested after the electron discharge device of the circuit has been removed.

Circuit testing equipment, as described hereinabove, provided with electron discharge device socket fitting probes is notably deficient in a number of respects, however. Since an electron discharge device must necessarily be removed from the equipment to be tested, it is apparent that the particular stage of the circuit involving the device cannot be tested with complete accuracy under service conditions. An obvious alternative solution would be to attach the leads or probes of the testing device to the desired pins of the electron discharge device or to the appropriate conducting parts of the socket while the electron discharge device is still plugged into its accommodating socket. However, arrangements of that nature would be both awkward and time consuming. Additionally, insofar as the testing of circuits involving relatively high frequency is concerned, for example any frequency in the megacycle range, such testing procedures are extremely inaccurate. Stray capacitances introduced by test leads, probes, or clips frequently assume unacceptable proportions, particularly in the megacycle range. Moreover, compensating for the resulting erroneous test readings is difficult or impossible. The precise position of the test lead, probe, or clip at the test point may be the controlling factor in determining the value of the stray capacitance introduced and hence results will necessarily vary from test to test.

It is therefore an object of the present invention to facilitate the testing of electronic circuitry under conditions closely approximating those of normal operation.

This object and others are achieved in a specific embodiment, employing principles of the invention, comprising test equipment specifically designed for testing successive stages in a high frequency transmission system. A number of the stages in the system employ the same type of electron discharge device. The test equipment, in accordance with the invention, employs an electron discharge device or tube of the same type used in the stages to be tested. The test probe device is so arranged that the pins of the tube in the device serve as the test probes and hence may be conveniently inserted or plugged into any tube socket adapted to receive a tube of that type.

While the convenience aspect of such an arrangement is obvious, an even more significant feature makes it possible to test a given stage without variation in the characteristics of the operating equipment, since the insertion of the test probe serves to restore the circuit substantially to its normal operating condition; i.e., a tube designed to occupy the tube socket at the point of test is in fact in the tube socket during the test.

In accordance with another aspect of the invention, the tube employed in the test device is mounted in a base provided with apertures suitable to accommodate relatively rigid connecting straps which provide conducting paths from certain of the tube pins to appropriate connecting points in a detector circuit which is mounted above the top of the tube. Between the top of the tube and the detector circuit is a partition, retaining plate, and pad assembly which serves the combined purposes of insulating the detector circuit from the tube, holding the tube in place, and supporting the detector element assembly.

The various elements of the test device, including the tube, are conveniently and compactly contained within a cylindrical casing, of metal for example. Fasteners, such as screws, clamp the lower part of the casing to the tube base and the middle part to the partition and retaining plate assembly. The device is closed by a cap which conveniently fits over the top of the casing, being secured to the casing by suitable fasteners. Also secured to the top is a vertical mounting plate which extends downwardly to the top of the partition. A number of lugs on the mounting plate serve as connecting points or terminals for the elements of the rectifier circuit. A variable capacitor adjusting screw and an output connecting socket extend through the casing cap. By connecting the output of the device to test equipment, to the vertical deflecting plates of an oscilloscope for example, a reading of the signal output from the stage under test can be achieved under conditions which are substantially identical to the conditions existing during normal service operation.

A complete understanding of the invention, together with additional objects and features thereof, will be gained from a consideration of the following detailed description and accompanying drawing in which:

FIG. 1 shows a test probe device, embodying principles of the invention, ready to be inserted in an empty socket of a circuit to be tested;

FIG. 2 is a schematic diagram of the FIG. 1 test probe device rectifier circuit;

FIG. 3 shows a plan view of the test device;

FIG. 4 shows a top view of FIG. 3 taken along the line 4—4 in the direction of the small arrows;

FIG. 5 shows a bottom view of FIG. 3 taken along the line 5—5 in the direction of the small arrows;

FIGS. 6 and 7 show partially cutaway plan views of opposite sides of the test device;

FIG. 8 shows a cross section view of the device as shown in FIG. 7, taken along the line 8—8 in the direction of the small arrows; and FIG. 9 shows a partial cross section view of FIG. 8 taken along the line 9—9 in the direction of the small arrows.

FIG. 1 illustrates a typical test arrangement in which the employment of a test probe device 8, constructed in accordance with the principles of the invention, would be particularly advantageous. The circuit to be tested, for example an IF amplifier, is mounted on chassis 1 and includes among its circuit elements electron tubes 2 through 7 which are plunged into accommodating sockets. It will be noted that the tube normally fitted in socket 56 has been withdrawn so that the test probe device 8 may be inserted in its place. Ideally, each of the tubes 2 through 7, and the tube withdrawn from socket 56 would be identical. In such a case, the tube inside the test probe device 8 would be substantially identical to all of the tubes of the circuit under test. Hence, any tube socket in the circuit to be tested could serve as a testing point for its related stage. From FIG. 1 it may also be seen that the device 8 comprises a base member 40, terminating in centering stud 41, which serves as the base for the outer casing 35. The casing 35 includes two rows of ventilating apertures 38 and 39. A cap 36, which fits over the top of the outer casing 35, has accommodating apertures for a capacitor adjusting screw 34 and an output socket 32. The output socket 32 is shown connected to an oscilloscope 9 by lead 33. It will, of course, be understood that the oscilloscope is merely illustrative of any one of a number of devices which might be used to interpret the output of the test probe.

FIG. 2 shows a circuit schematic diagram of the rectifier circuit together with an electron tube 10 which is a part of the test probe 8. The particular tube shown is a tetrode on the assumption that the tube withdrawn from socket 56 in FIG. 1 is a tetrode of the same type. In accordance with the invention, the tube which forms a part of the test probe is substantially identical to the circuit tube withdrawn from the stage under test. Identifying now the elements of the tetrode 10 shown in FIG. 2, the heater 11 terminates in pins 18 and 20, the cathode 12 terminates in three pins 17, 53, and 54 (three leads and associated pins are used to reduce lead inductance), the control grid 13 terminals in pin 16, and the screen grid 14 terminates in pin 21. Anode 15 also terminates in a pin, shown as pin 55 in FIG. 5. As will be explained in more detail later herein, the anode pin is shortened to preclude contact with the output circuitry of the stage under test. Plate voltage for the tube is provided by connecting the shortened anode pin 55, best seen in FIG. 7, to the screen pin 21 through an RF choke 22.

The output of the test probe tube 10 is shown coupled to detector circuit but in a particular test it will be understood that another type of circuit might well be more suitable. In the circuit shown, a blocking capacitor 23 couples the signal from the plate 15 to a resistance voltage divider comprising resistors 26 and 27. The voltage divider is paralleled by capacitor 24 and by a trimmer capacitor 25. The trimmer capacitor 25 compensates for component differences and is adjusted when calibrating the test probe. The output of the voltage divider is detected by diode 28. The detected output is filtered by a low-pass filter comprising inductor 30 and capacitors 29 and 31. A suitable terminal 32, a jack for example, is placed at the output of the filter so that an output connection may be made to output lead 33.

Certain outside details of the test probe not clearly shown in FIG. 1 may be seen in FIGS. 3, 4, and 5. The test probe casing 35 is an open cylinder, of metal for example, and is provided with a tube base 40, which may advantageously be a molded phenolic member. The casing 35 is secured to the base 40 by conventional fasteners, for example screws 42. The inside partition and retainer assembly 43 is fastened to the casing 35 by screws 44 and the top cap 36 is similarly fastened by screws 37. Although the test probe tube shows a total of nine pins, as previously noted the particular tube employed is selected to meet the requirements of the circuit under test. The identification of the pins shown in FIG. 3 and in FIG. 5 is as follows: screen grid pin 21, first heater pin 20, cathode pins 17, 53, and 54, second heater pin 18, control grid pin 16, blank pin 19, and sheared anode pin 55.

Additional details of internal construction may be seen from FIG. 6. For example, it will be observed that a mounting plate 62 is conventionally secured to the inside of casing cap 36 by the rivets 64. Mounting plate 62 provides various connector lugs or terminals 63 which serve as common interconnecting points for certain of the elements of the rectifier circuit. For example, shown in FIG. 6 are capacitor 24, resistors 26 and 27, and variable capacitor 25.

The cutaway central portion of the probe illustrated in FIG. 6 shows that partition 43 effectively isolates the test probe casing 35 into two compartments, the lower compartment housing tube 10 and the upper compartment housing the rectifier circuit elements. Additionally, partition 43 serves as a base for positioning plate 48 which in turn has its dish-shaped surface in contact with a pad 52 which serves as a positioning element and support for the top of tube 10. The pad 52 is preferably of a resilient, heat resistant material. Positioning plate 48 is held in place against the partition 43 by the small retaining screw 47.

FIGS. 7, 8, and 9 best illustrate the manner in which certain of the elements of tube 10 are joined to the rectifier circuit by connecting means exterior to the tube envelope. For example, FIG. 7 shows heater pin 20, which is also circuit ground, extending through base 40 with its upper or base end conductively joined to a flat conducting strap 67. The strap 67 has a first flat section running parallel to the tube base 40 and is provided with a slit or aperture, not shown, which through a force fit accommodates the pin 20, thereby affording good mechanical and electrical contact between the strap 67 and the pin 20. After a right-angle bend the strap 67 runs vertically to a point just above the tube base 40 where is assumes a curved or U-shaped configuration. In the hollow formed thereby an extension pin 56 is suitably attached, as by soldering. The extension pin 56 is in turn joined to the connector lug 59. Similarly, a conducting path from screen grid pin 21 to the rectifier circuit is provided through the strap 68, with its curved portion 50, extension pin 57, and connector lug 60.

The anode pin connector arrangement is shown in FIG. 9. There the right angle bend in the strap 66 may be seen as well as the point where the strap 66 is depressed into the accommodating hole of the tube base 40. It is at that point that the sides of the slit or aperture, not shown, in the strap 66 grip the pin 55. As in the connector arrangements described hereinabove, the anode pin connecting strap 66 terminates in a curved section 49 which is joined to an extension pin 58. The final connection is between the extension pin 58 and the connector lug 61 which is connected to capacitor 23 of the detector circuit.

By way of example, a test probe device in accordance with the invention may be designed to test a multistage IF amplifier having a plurality of stages employing identical electron tubes, such as is represented pictorially in FIG. 1. In operation, the test probe is first calibrated with a sweep-frequency generator and known amplifier and the trimmer capacitor 25 is adjusted for flat transmission, across the frequency band of interest, at a desired transmission level. The stages of the circuit to be tested are then preferably tested in order with the level of the sweep generator, applied to the amplifier input, adjusted to give the same detector output level as in the calibration procedure. When the test probe device is inserted in a socket, from which an electron tube similar to the tube in the probe has been removed, the test probe tube 10 uses the grid and cathode circuits of the stage under test. Since the anode pin 55 is sheared, it does not make contact with the output circuit of the stage under test. The resulting gain-frequency characteristic of the stages between the sweep generator input and the oscilloscope 9 may then be observed on the face of the latter.

It is to be understood that the above-described embodiment of the invention is only illustrative of the principles involved. Numerous other arrangements may be devised by those skilled in the art without departing from the spirit or scope of the invention.

What is claimed is:

1. A test-probe device for testing circuitry which includes at least one electron-discharge device and an accommodating socket therefor, said probe device comprising, in combination, a test electron-discharge device having a plurality of electrodes including an output electrode, having characteristics substantially identical to said one electron-discharge device, and having a plurality of terminal pins each connected to a corresponding one of said electrodes, the terminal pin corresponding to said output electrode being relatively short to preclude electrical contact with said accommodating socket; means responsive to the insertion of all but the last named one of said terminal pins into said socket for deriving an output signal indicative of the characteristics of said circuit, said signal-deriving means comprising a voltage divider, a detector, a filter circuit and means connecting said output-electrode terminal pin to said voltage divider; means positioning said signal-deriving means in juxtaposed relation to said test electron-discharge device; and means encasing said test electron-discharge device, said signal-deriving means and said positioning means in a unitary test-probe assembly.

2. A test-probe device for testing circuitry, which includes at least one electron-discharge device and an accommodating socket therefor, said probe device comprising, in combination, a test electron-discharge device having a plurality of electrodes including an output electrode and corresponding terminal pins, the terminal pin associated with said output electrode being relatively short thereby to preclude electrical contact with said socket; means including a voltage divider, a detector and a filter responsive to a signal on said output electrode for deriving an output signal indicative of the characteristics of said circuit; a conducting path for applying signals from the output-electrode terminal pin of said test electron-discharge device to said signal-deriving means; cushioned, spacing means positioning said signal-deriving means in insulated, juxtaposed relation to said test electron-discharge device; and means encasing said test electron-discharge device, said signal-deriving means, said conducting path and said spacing means in a unitary test-probe assembly; said test electron-discharge device having characteristics substantially identical to the characteristics of said one electron-discharge device, whereby the testing of said circuit may be conducted under conditions substantially identical to those encountered under normal operation.

References Cited in the file of this patent

UNITED STATES PATENTS

| | | |
|---|---|---|
| 2,088,355 | Wehming | July 27, 1937 |
| 2,186,184 | Tubbs | Jan. 9, 1940 |
| 2,578,288 | Cook | Dec. 11, 1951 |
| 2,894,205 | Schrock et al. | July 7, 1959 |
| 2,912,647 | Krystek | Nov. 10, 1959 |
| 2,946,001 | Russell | July 19, 1960 |

OTHER REFERENCES

Krueger: "Radio and Television News," January 1951; pages 64–66.

Bray: "Radio-Electronics," March 1956; pages 97, 100–102.